United States Patent [19]

Heinzen

[11] Patent Number: 4,826,197
[45] Date of Patent: May 2, 1989

[54] TRAILER WITH AUTOMATIC BOAT DOCKER

[76] Inventor: Ralph Heinzen, P.O. Box 728, Garrison, N. Dak. 58540

[21] Appl. No.: 59,045

[22] Filed: Jun. 8, 1987

[51] Int. Cl.⁴ ............................................. B62D 3/10
[52] U.S. Cl. .................................. 280/414.1; 414/536; 414/909
[58] Field of Search ..................... 280/414.1; 414/477, 414/478, 479, 480, 494, 536, 909; 180/6.5; 254/362

[56] References Cited

U.S. PATENT DOCUMENTS

| | | |
|---|---|---|
| 3,938,829 | 2/1976 | Anderson ........................ 280/414.1 |
| 3,989,267 | 11/1976 | Robinson ........................ 280/414.1 |
| 3,993,324 | 11/1976 | Carrick ........................... 280/414.1 |
| 4,010,962 | 3/1977 | Groblebe ........................ 280/414.1 |
| 4,114,920 | 9/1978 | Boettcher ....................... 280/414.1 |
| 4,138,135 | 2/1979 | Hewitt ............................. 280/414.1 |
| 4,226,292 | 10/1980 | Monte et al. ...................... 180/6.5 |
| 4,463,965 | 8/1984 | Lawson ........................... 280/414.1 |
| 4,529,217 | 7/1985 | Wood .............................. 280/414.1 |

Primary Examiner—David M. Mitchell
Assistant Examiner—Donn McGiehan
Attorney, Agent, or Firm—Merchant, Gould, Smith, Edell, Welter & Schmidt

[57] ABSTRACT

The present invention relates to a device for securing a boat to a trailer. The mechanism for securing the boat is electrically driven and may include a motor driven reciprocating pin. The device is remotely actuated for example by a radio transmitter.

10 Claims, 5 Drawing Sheets

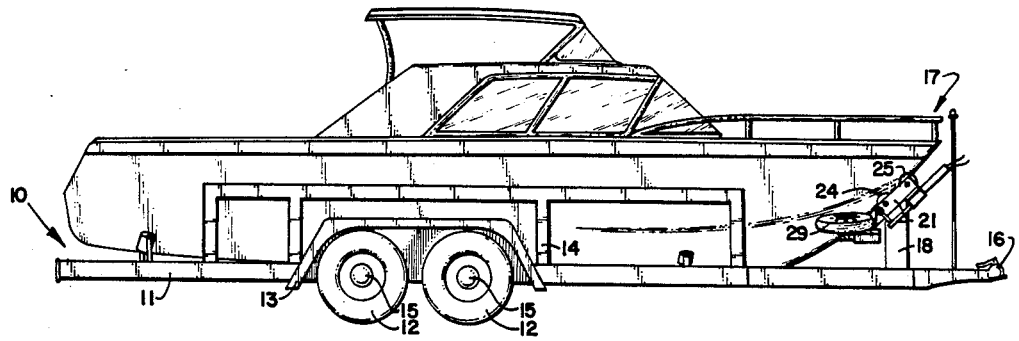

TRAILER WITH AUTOMATIC BOAT DOCKER

FIELD OF THE INVENTION

The present invention relates to towable vehicles and more particularly to boat trailers including a mechanism for securing the boat to the trailer.

BACKGROUND OF THE INVENTION

Trailers have long been in use for towing boats behind automobiles. Those persons that have loaded and unloaded boats from such trailers into navigable waters such as rivers and lakes recognize the difficulty encountered in securing and releasing the boat from the trailer.

Securement of a boat to its trailer has generally included use of a winch carrying a retractable rope. To load the boat, the trailer is backed into the water and rope is stripped from the winch and fastened to an eye at the forward portion of the boat. The winch is then cranked and the boat is drawn onto the trailer. In such a process, several difficulties are encountered. It often requires the user to wade into the water to secure the rope to the boat. If the winch is hand operated, it often requires a good deal of effort to draw the boat onto the trailer. This is true even though tracks and rollers are provided on the trailer. It is not at all uncommon for the rope to break after repeated use due to the substantial force required to draw. This results in a winch rope that is too short for ready use. It would be desirable to have a mechanism in which the boat operator could merely drive the motorized boat to a position over the trailer, activate a locking mechanism and thus secure the boat in place.

SUMMARY OF THE PRESENT INVENTION

The present invention relates to a boat trailer including a frame which is supported on a plurality of wheels. The frame has a trailer hitch in the forward portion for securing the trailer to the towing vehicle. The trailer includes a guide mechanism for positioning the forward portion of the boat into a proper storage position and remote control locking mechanism for securing the boat to the trailer.

DETAILED DESCRIPTION OF THE PRESENT INVENTION

Figure 1:
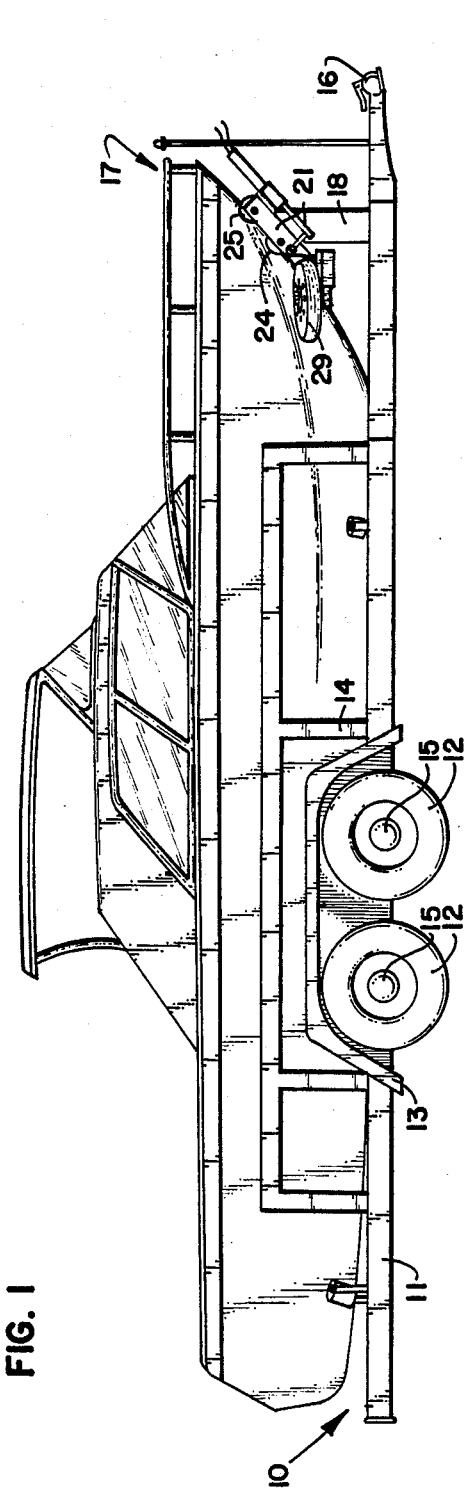
FIG. 1 is a side plan view of the present invention with a boat properly stowed on the trailer.

The boat trailer of the present invention, one embodiment 10 of which is illustrated in FIGS. 1-6, may include a suitable frame 11 which is supported on a plurality of wheels 12. The frame 11 of the present invention 10 may be constructed of channel iron. The wheels 12, of course, are conventionally mounted on suitable axles or stub axles 15. The trailer 10 may include fenders 13, if desired, to prevent the propelling mud and/or small stones onto the boat while travelling. The frame 11 may have upstanding side rails 14 to assist in alignment and retention of the boat on the trailer 10, particularly while loading the boat. The frame 11 includes a suitable hitch mechanism 16, in this case a conventional ball and socket hitch.

Figure 2:
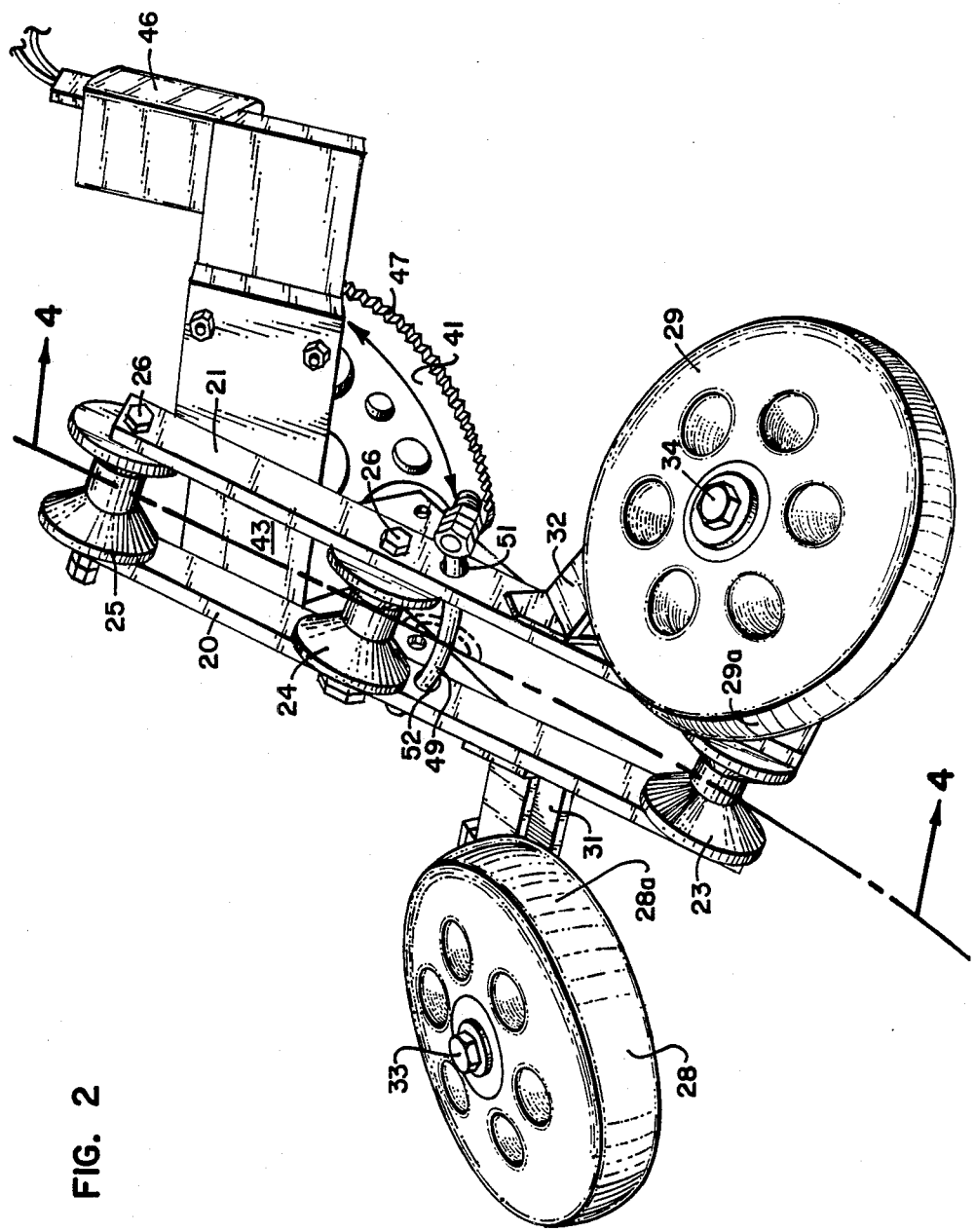
FIG. 2 shows the guide mechanism and the locking device of the present invention.
Figure 3:
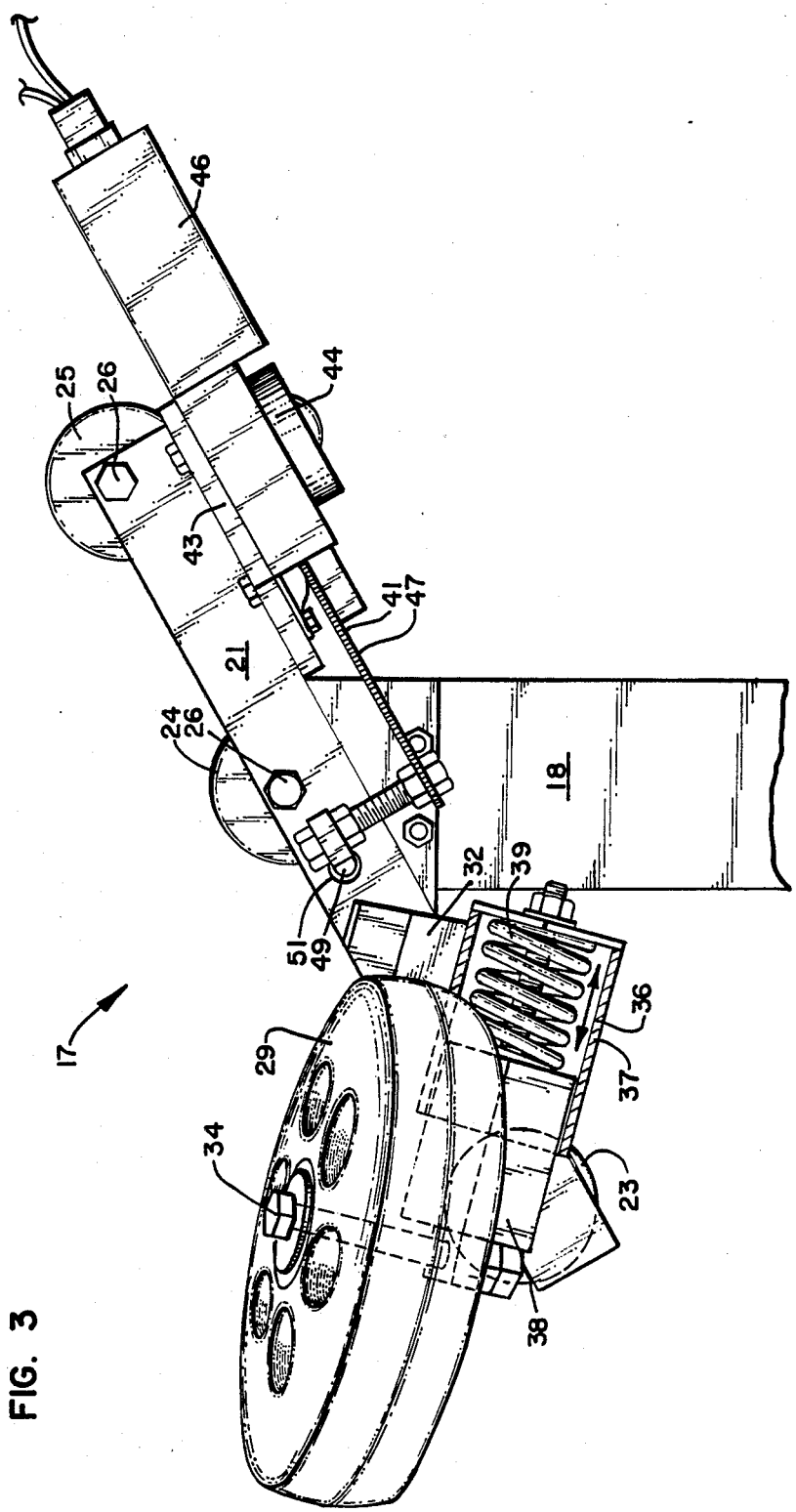
FIG. 3 is a side view of the device of FIG. 2.

The present trailer 10 includes a guide and locking mechanism 17 at the forward portion thereof for securing the boat to the trailer. The guide and locking mechanism 17 includes an upstanding post 18 which is integral at its lower end to the frame 11 of the trailer 10 (FIGS. 1 and 3). Referring to the guide and locking mechanism 17, as illustrated in FIG. 2, the device 17 includes a pair of elongated side members 20, 21 that may be constructed of metal bar stock. The bars 20, 21 include a plurality of rollers 23, 24, and 25 which are rotatably supported therebetween on shafts 26 which extend between bars 20, 21. The shafts 26 may comprise bolts of appropriate size. The rollers 23-25 may be of a type conventionally used on boat trailers for support purposes. Typically, the rollers 23-25 are constructed of a stiff rubber or polymeric material, rather similar to automobile tire material. The rollers, such as roller 24, serve to stop the boat at the proper location over the trailer. The rollers 23-25 serve to guide and secure the boat from lateral movement when in a loaded position on the trailer 10. The guide and locking mechanism also includes a guide post and light 27 to assist in positioning the boat, particularly in the darkness.

A pair of large rollers 28, 29 are provided to properly locate the bow of the boat with respect to the mechanism 17. Desirably the innermost point 28a and 29a of roller 28 and 29, e.g., the point at which the boat contacts the rollers 28 and 29, lie on parallel lines running through the bars 20, 21. The rollers 28, 29 may be suitably mounted to the respective bars 20, 21 by brackets 31, 32 respectively. Bracket 31, for example, may be of steel strap material and may be welded to bar 20 as illustrated in FIG. 2. Bracket 31 includes an upstanding shaft 33 on which the roller 28 is rotatably mounted. The lower end of shaft 33 may be supported as hereinafter described. The roller 28, for example, may be of a suitable polymeric material, preferably a light weight yet sturdy construction which can withstand the forces of the boat as the boat is loaded on the trailer.

The bracket 32 (FIGS. 2 and 3) may likewise include an upstanding shaft 34 on which the roller 29 is rotatably supported. The shafts 33, 34 may, for example, be a screw that is threadedly engaged with the portion of the brackets immediately therebeneath.

Figure 4:
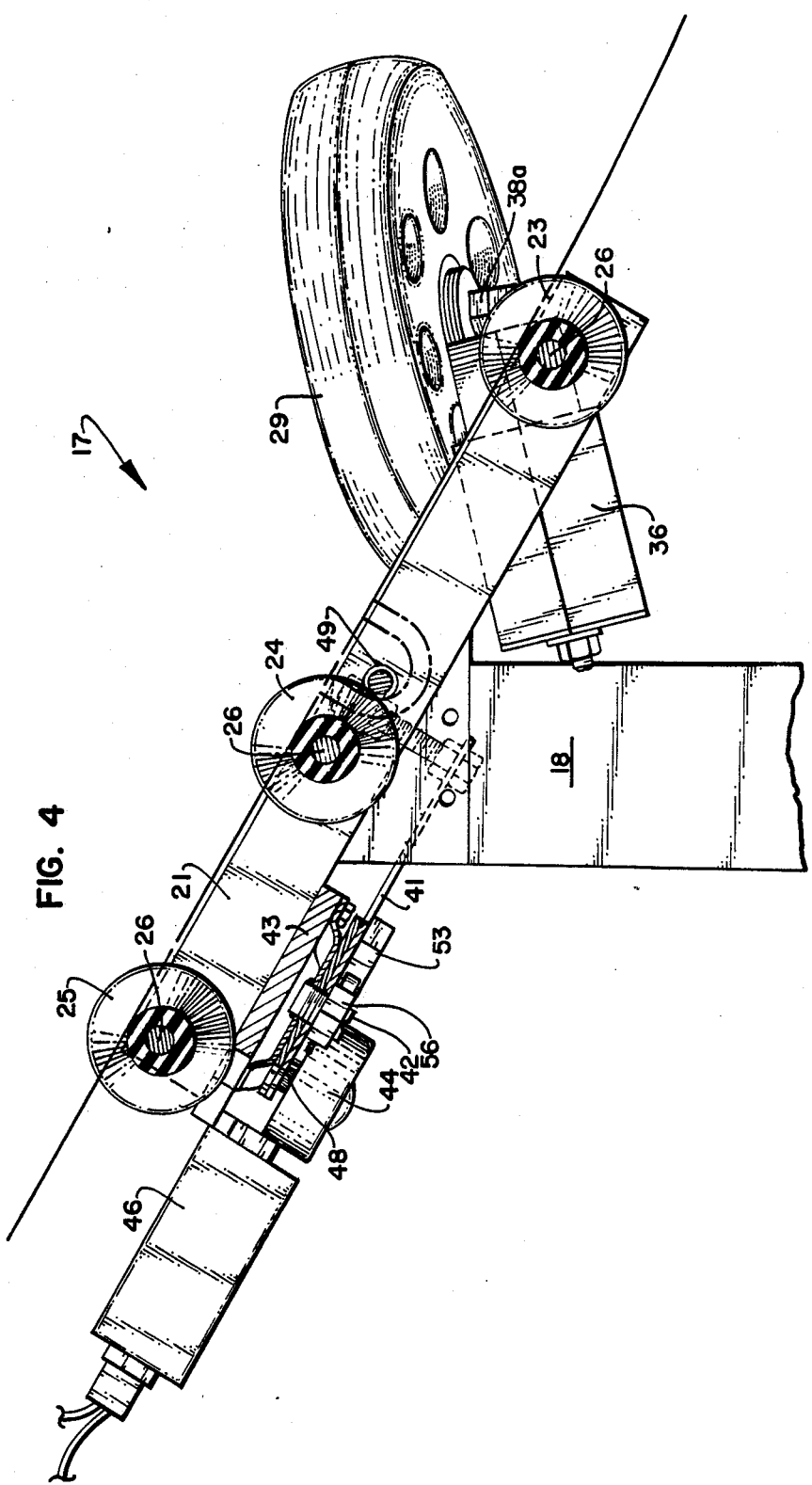
FIG. 4 is a sectional view taken along the line 4—4 in FIG. 2.

The bracket 31 may include a shock absorber, as illustrated in FIGS. 3 and 4. The shock absorber 36 may include a first tubular portion 37 into which a second tubular portion 38 may telescope. A suitable spring 39 may serve to resist the inward movement of the portion 38 into portion 37. The shaft 34 may be, for example, supportively engaged with telescoping portion 38 such that when a force is applied in a rightward direction to the roller 28, as viewed in FIG. 3, the force is transmitted downwardly through the shaft 34 to portion 38. Portion 38 may include a flange 38a to which shaft 34 is secured. The portion 38 in turn telescopes into portion 37 overcoming and compressing the spring 39. The spring 39 thus cushions the shock of the boat thereby halting the boat. The force needed to compress the shock absorber 36 varies depending on the size of boat for which the trailer is designed. Typically, the force will be 150 to 300 pounds per inch compression to handle boats in the range of 2,000 to 4,000 pounds weight.

Figure 5:
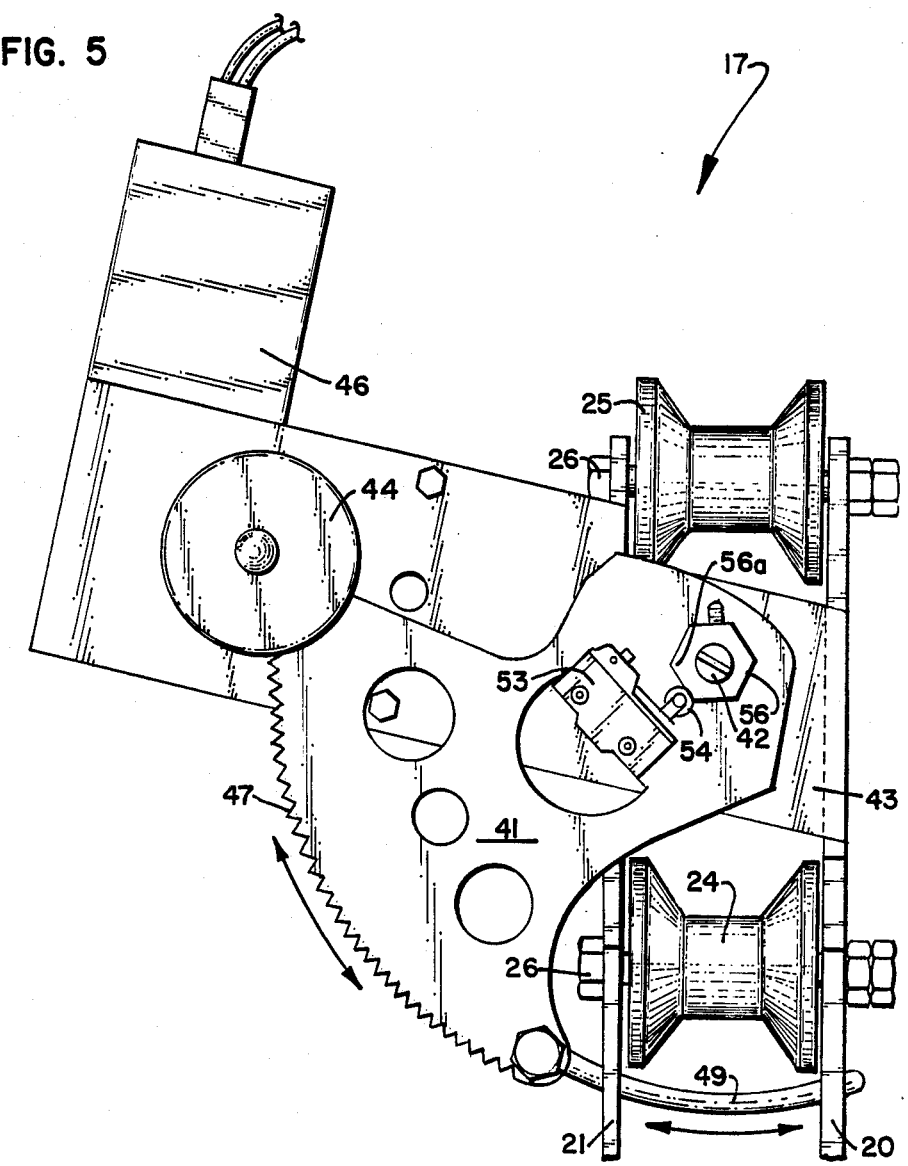
FIG. 5 is a plan view of a portion of the locking mechanism of the present invention.

The locking device 17, as illustrated in FIGS. 4 and 5, includes a trunnion 41 which is pivotally mounted to a support 43. The support 43 may be secured such as by welding to the bars 20 and 21. Also mounted on support 43 is a small electric motor 44 and suitable electrical controls 46. The trunnion 41 may be of any suitable construction, including a toothed arcuate portion 47 which engages a tooth gear 48 which is rotatably driven by motor 44. The trunnion 41 carries an arcuate shaped rod 49 secured in place by bolt 50. The rod 49 is moved through openings 51 and 52 in the bars 20 and 21 by the movement of the trunnion 41. The trunnion 41 is moved rightwardly to insert the rod 49 through such openings and moved leftwardly to remove rod 49 from such openings. The trunnion 41 may carry a switch 53 which acts in conjunction with the circuitry, for example, relays contained in control box 46 to control the direction of movement of the trunnion 49. Direct current moves in one direction to operate motor 44 to rotate the gear 48 in a counter-clockwise direction as viewed from above, thereby moving the rod 49 into the position illustrated in FIG. 5. The motor is of a size sufficient to properly move the trunion 41 and desirably is in the range of about ¼ to ⅓ horsepower. An electrical charge passes through switch 53 to control box 46 to cut off current to motor 44 and reverse the switching so that current will flow to motor 44 in the opposite direction when the current is again activated. In other words, as the switch portion 54 moves over the extending portion 56a of burr 56, the direction of current flow is reversed. Thus, the next time the current is activated it flows in the opposite direction to operate motor 44 to withdraw rod 49 leftwardly from the position illustrated in FIG. 5. The switch 53 may be a unit produced by Potter and Bromfield under the designation PRD5DYO-12 volt. Switch 53 also serves to control the period of time current is fed to motor 44 and thus sets the distance the trunnion 44 travels and in turn the distance traveled by rod 49. The light 27 may include a second bulb which is activated by switch 53 to signal when the rod 49 is fully inserted or fully withdrawn from the locking position.

Figure 6:
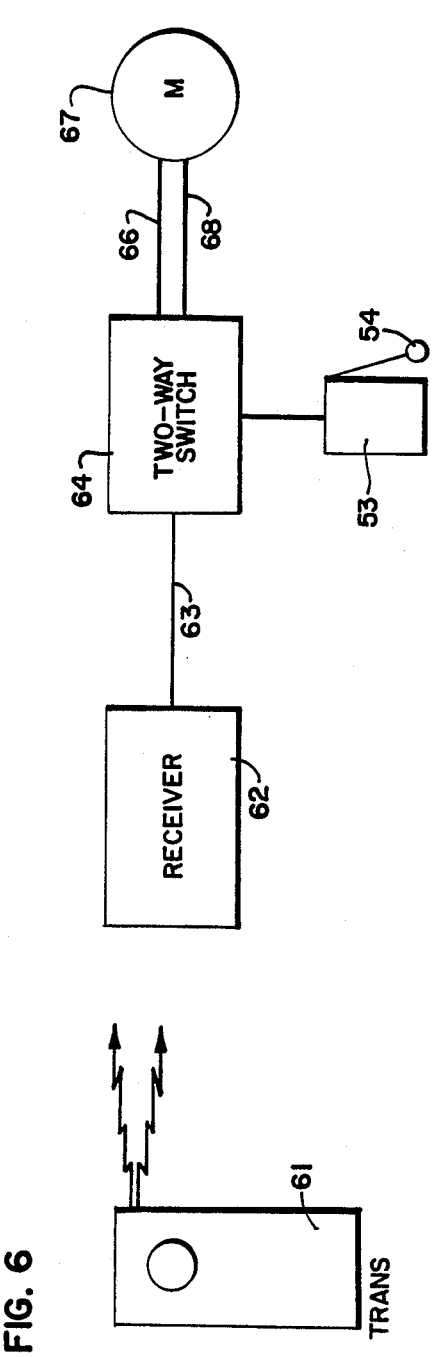
FIG. 6 is a schematic illustration of the remote control system of the present invention.

The schematic illustration in FIG. 6 shows such operation. The transmitter 61 may be activated to send a signal to the receiver 62. Such signal activates a current flow switch causing DC current to flow along the line 63 to the two-way switch 64. A suitable switch for use in control box 64 in reversing current flow is a relay produced by Potter and Bromfield under the designation Model No. S89R11DB01-12 volt. If the switch 54 is in one position, the current is caused to move along wire 66 to the motor 67, which in turn causes the gear 48 to rotate in one direction to withdraw the rod 49. As the switch portion 54 moves over the extended portion 56A of the burr 56, it is depressed, thereby causing the two-way switch 64 to reverse polarity and simultaneously deactivate the receiver 62. When the receiver 62 is again activated by the transmitter 61, current passes along wire 63 to the two-way switch 64 and then along wire 68 to motor 67, thus causing the gear 48 to rotate in a reverse direction, moving the rod 49 into the position illustrated in FIG. 5. The transmitter 61 may include a second signal transmitting device that serves to activate a switch that turns on light 27. A suitable transmitter 61 that may be used is one produced by Linear Corporation under the designation D-22A which transmits a signal at a frequency of 303.875. The receiver 62 may be a unit also from Linear Corporation under the designation D-67.

While the present invention has been disclosed in one specific embodiment in FIGS. 1 through 6, it is to be recognized that various modifications may be made without departing from the broader scope of the present invention. For example, the large rollers 28 and 29 each may be replaced with a series of rollers which are aligned to form a funnel that directs the boat into the desired position. Also, the signal device may be operated by transmitting a light beam or a particular sound frequency.

What is claimed is:

1. A boat trailer suitable for loading and unloading of a boat by a single individual located within the boat, said trailer comprising a frame supported on a pair of wheels, said frame including means for securing a boat to the trailer, said securing means comprising an electrically powered remote controlled locking device for interengaging said trailer and said boat, said locking device comprising a radio transmitter, a radio receiver, a relay switch, a reversible electrically powered motor, and a reciprocably driven pin, said radio transmitter serving to control said radio receiver which in turn serves to control said motor through said relay switch to drive said driven pin, said pin serving to engage and disengage an eye on said boat.

2. A boat trailer comprising a frame supported on a pair of wheels, said frame including means for securing a boat to the trailer, said securing means comprising an electrically powered remote controlled locking device for interengaging said trailer and said boat, said locking device comprising a radio transmitter, a radio receiver and a reciprocably driven pin, said radio transmitter serving to control said radio receiver which in turn serves to control said driven pin, said pin serving to engage an eye on said boat, wherein said driven pin comprises a reversible motor with a gear mechanism, said gear mechanism comprising a first gear means mounted on said motor and engaging a second gear means which carries a pin along an arcuate path to engage the eye of said boat.

3. The boat trailer of claim 2 wherein said locking device includes switch for reversing the direction of the flow of current to the motor.

4. A boat trailer comprising a frame supported on at least a pair of wheels, said frame including means for securing a boat to said trailer, said securing means comprising a pair of side members, an electric motor adjacent said side members, a trunnion arcuately driven by said motor, said trunnion carrying a rod, said rod being selectively moved into a position of engagement with said side members and an eye carried by said boat, and a position disengaged from said side members and said boat eye.

5. The boat trailer of claim 4 wherein said motor is operable in one rotational direction to move said trunnion and in turn move said rod into said engagement and wherein said motor is operable in an opposite direction to move said trunnion and in turn said rod out of said engagement.

6. The boat trailer of claim 4 wherein said motor includes switching means to control said motor, said switching means including remote control means.

7. The boat trailer of claim 5 wherein said motor includes switching means to control said motor, said switching means including remote control means.

8. The boat trailer of claim 6 wherein said remote control means comprise radio signal control means.

9. The boat trailer of claim 7 wherein said switching means includes a two-way switch for reversing the polarity to said of the electric current fed to said motor, thereby reversing the direction of movement of said motor.

10. The boat trailer of claim 9 wherein said securement means includes a pair of enlarged rollers for guiding the boat wherein the eye is caused to align with said rod.

* * * * *